US 11,028,886 B2

(12) United States Patent
Kracke

(10) Patent No.: US 11,028,886 B2
(45) Date of Patent: Jun. 8, 2021

(54) INDICATOR SYSTEM FOR TORQUE LIMITER

(71) Applicant: Goodrich Actuation Systems Limited, Solihull (GB)

(72) Inventor: Jeremy Kracke, Staffordshire (GB)

(73) Assignee: GOODRICH ACTUATION SYSTEMS LIMITED, Wolverhampton (GB)

( * ) Notice: Subject to any disclaimer, the term of this patent is extended or adjusted under 35 U.S.C. 154(b) by 153 days.

(21) Appl. No.: 16/059,272

(22) Filed: Aug. 9, 2018

(65) Prior Publication Data

US 2019/0063516 A1 Feb. 28, 2019

(30) Foreign Application Priority Data

Aug. 24, 2017 (EP) .................................... 17275127

(51) Int. Cl.
*F16D 43/202* (2006.01)
*F16D 11/14* (2006.01)
*F16D 67/00* (2006.01)
*F16D 59/00* (2006.01)

(52) U.S. Cl.
CPC ......... *F16D 43/2024* (2013.01); *F16D 67/00* (2013.01); *F16D 11/14* (2013.01); *F16D 59/00* (2013.01)

(58) Field of Classification Search
CPC ....... F16D 7/04–046; F16D 43/20–218; F16D 67/02
See application file for complete search history.

(56) References Cited

U.S. PATENT DOCUMENTS

| 1,999,523 | A | * | 4/1935 | Willoughby | ........ F16D 43/2024 192/56.53 |
| 2,291,407 | A | * | 7/1942 | Paul | .................... F16D 43/2024 464/39 |
| 3,329,243 | A | * | 7/1967 | Gibb | ....................... F16D 59/00 188/134 |
| 4,255,946 | A | | 3/1981 | Hansen | |
| 4,909,364 | A | * | 3/1990 | Grimm | ................... F16D 11/14 192/108 |

(Continued)

OTHER PUBLICATIONS

Extended European Search Report for International Application No. 17275127.3 dated Mar. 27, 2018, 6 pages.

*Primary Examiner* — Ernesto A Suarez
*Assistant Examiner* — James J Taylor, II
(74) *Attorney, Agent, or Firm* — Cantor Colburn LLP

(57) ABSTRACT

There is provided an indicator system for a torque limiter. The system comprises a first component extending around an axis (A) and comprising one or more radially extending cam surfaces, and a second component in combination with a third component. The third component is fixed against rotation relative to the second component, but is axially movable relative to the second component. The third component comprises one or more notches, each receiving one of the radially extending cam surfaces. Upon relative rotation between the first component and the combination of the second component and the third component, a surface of each of the notches is configured to ride up a corresponding cam surface of the first component, causing the third component to move axially away from the second component.

13 Claims, 3 Drawing Sheets

(56) References Cited

U.S. PATENT DOCUMENTS

| | | | | |
|---|---|---|---|---|
| 5,199,538 A * | 4/1993 | Fischer | ............... | B64C 9/16 |
| | | | | 192/223.3 |
| 5,901,817 A | 3/1999 | Gitnes | | |
| 6,464,061 B1 * | 10/2002 | Inoue | ............... | F16D 7/028 |
| | | | | 188/134 |
| 10,274,027 B2 * | 4/2019 | Matthews | ............ | F16D 43/2024 |
| 2008/0015034 A1 * | 1/2008 | Downey | ............ | A01D 69/08 |
| | | | | 464/39 |
| 2009/0302246 A1 | 12/2009 | Dolenti | | |

\* cited by examiner

INDICATOR SYSTEM FOR TORQUE LIMITER

FOREIGN PRIORITY

This application claims priority to European Patent Application No. 17275127.3 filed Aug. 24, 2017, the entire contents of which is incorporated herein by reference.

FIELD

The present disclosure relates generally to an indicator system for a torque limiter, and more specifically to a new type of indicator member that translates in order to provide an indication that a torque limiter has tripped.

BACKGROUND

Torque limiters are known in the art and comprise an input shaft and an output shaft, wherein torque is transferred from the input shaft to the output shaft in use. One or more coupling members may be provided to transmit torque from the input shaft to the output shaft. A number of systems are known in the art for preventing the overload of the coupling between the input shaft and the output shaft, which is the aim of the torque limiter. These typically work by employing a brake that is activated once a predetermined torque limit is exceeded. This method of limiting torque is typically used in aircraft applications, for example when actuating an aircraft flight control surface, in order to protect the actuator from damage.

It is known to provide a device that indicates when a torque limiting device has been activated, or tripped during flight. FIG. 1 shows a conventional torque limiting device 10.

An input shaft 2 is operatively connected to an output shaft 1 via one or more coupling members (not shown). As is known, the coupling members are typically configured to brake the input shaft and/or the output shaft upon a torque from the input shaft exceeding a predetermined amount. Various methods of braking are known in the art. For example, in some arrangements a cam member may be linked to the input or output shaft. Upon the input torque exceeding a predetermined amount, the cam member may cause a cam surface to begin to rotate and force a roller to contact a stationary outer ring, which locks the cam member and, in turn, the input shaft. Other arrangements are also possible, and so the specific structure of the torque limiter 10 will not be described herein in detail.

In order to provide the indication that the torque limiter 10 has tripped, upon braking the coupling members initiate relative rotation between the input shaft 2 and the output shaft 1. A disc 3 is axially movable within the housing of the torque limiter 10, and is linked to the input shaft 2 via a ball spline arrangement 3, which restricts the rotational movement of the disc 3. One or more pins 4 are connected with the disc 3 and each pin 4 is located within a corresponding V-shaped slot 5. Each of the pins 4 are axially movable with the disc 3.

Upon relative movement of the input shaft 2 and the output shaft 1, the pins 4 ride up their corresponding slot 5, which pushes the disc 3 in an axial direction away from the output shaft 1. An indicator pin 6 is connected to the disc 3, such that this axial movement of the disc 3 causes the indicator pin 6 to move at least partially out of a slot 7 in the housing of the torque limiter 10 within which it sits. As such, upon inspecting the torque limiter 10, an operator can immediately see that the torque limiter 10 has tripped by viewing the indicator pin 6 protruding from the slot 7.

Other devices are known in the art for converting the differential rotation of the input and output shafts into an axial movement which can be used to operate an indicator device, such as a pin are shown in FIG. 1. Such conventional systems are subject to high contact stresses and are vulnerable to excessive wear. For example, the ball spline arrangement shown in FIG. 1 has been found to be quite delicate, and the small bearings sometimes run out onto the shaft, reducing the effectiveness of the torque limiter.

It is desired to improve the system of indicating that a torque limiter has tripped.

SUMMARY

In accordance with an aspect of the present disclosure, there is provided an indicator system for a torque limiter, comprising: a first component extending around an axis and comprising one or more radially extending cam surfaces; a second component and (e.g., in combination with) a third component, wherein the third component is fixed against rotation relative to the second component, but is axially movable relative to the second component; wherein the third component comprises one or more notches, each receiving one of the radially extending cam surfaces, and upon relative rotation between the first component and the second component and the third component (e.g., the combination of the second component and the third component), a surface of each of the notches is configured to ride up a corresponding cam surface of the first component, causing the third component to move axially away from the second component.

The second component may comprise one or more axially extending slots and the third component may comprise one or more radially extending protrusions each configured to slot into one of the axially extending slots, so as to prevent relative rotation between the second component and the third component whilst allowing axial movement between the second component and the third component.

The radially extending cam surfaces and the corresponding notches may be V-shaped.

The third component may be in sliding engagement with the first component, such that the third component is able to slide axially along the first component.

The third component may comprises an inner circumferential surface configured to slide onto an outer circumferential surface of the first component.

The combination of the second component and the third component may be located concentrically around the first component.

One or more of the first component, the second component and the third component may be in the form of a substantially annular (ring-like) body. By "ring-like", it is meant that all or a portion of the respective component may be in the shape of a ring.

The first component may comprise a plurality of axially extending splines configured to slot into corresponding splines located on a shaft of a torque limiter.

The first component may comprise a first portion configured to support the third component in a sliding engagement (e.g., in use), and a second portion comprising the radially extending cam surfaces, wherein the first portion is axially displaced from the second portion.

In accordance with an aspect of the disclosure, there is provided a torque limiter comprising an indicator system as described above.

The torque limiter may comprise: a first shaft operatively attached to the first component such that the first component rotates with the first shaft; a second shaft operatively attached to the second component such that the second component rotates with the second shaft.

Upon an applied torque to one of the first shaft or the second shaft exceeding a predetermined or specified amount, the first component may be configured to rotate relative to the second component and cause the third component to move axially away from the second component as aforesaid.

The torque limiter may further comprise an indicator member configured to move upon axial movement of the third component away from the second component when an applied torque to one of the first shaft or the second shaft exceeds the predetermined or specified amount. The indicator member may be configured to move out of a cavity in a housing portion of the torque limiter (e.g., upon axial movement of the third component away from the second component), so as to provide a visual indication that the torque limiter has tripped upon inspecting the torque limiter.

The torque limiter may further comprise a movable abutment movable with the third component and configured to displace a pin located in a cavity of the housing portion of the torque limiter upon axial movement of the third component away from the second component, wherein the pin is configured to displace the indicator member out of its cavity in the housing portion to provide the visual indication that the torque limiter has tripped.

In accordance with an aspect of the disclosure, there is provided a method of indicating that a torque limiter (e.g., a torque limiter as described above) has tripped, comprising: providing a first component extending around an axis and comprising one or more radially extending cam surfaces; providing a second component and a third component, wherein the third component is fixed against rotation relative to the second component, but is axially movable relative to the second component; wherein the third component comprises one or more notches, each receiving one of the radially extending cam surfaces. Upon relative rotation between the first component and the second component and the third component (e.g., the combination of the second component and the third component), a surface of each of the notches is configured to ride up a corresponding cam surface of the first component, causing the third component to move axially away from the second component.

In accordance with an aspect of the disclosure, there is provided a method of indicating that a torque limiter has tripped, comprising: transferring torque between a first shaft and a second shaft; rotating a first component relative to a second component when an applied torque to one of the first shaft or the second shaft exceeds a predetermined or specified amount; and axially moving a third component upon rotation of the first component relative to the second component.

The torque limiter may comprise a torque limiter as described above.

BRIEF DESCRIPTION OF THE DRAWINGS

Various embodiments will now be described, by way of example only, and with reference to the accompanying drawings in which.

DETAILED DESCRIPTION

Figure 2:
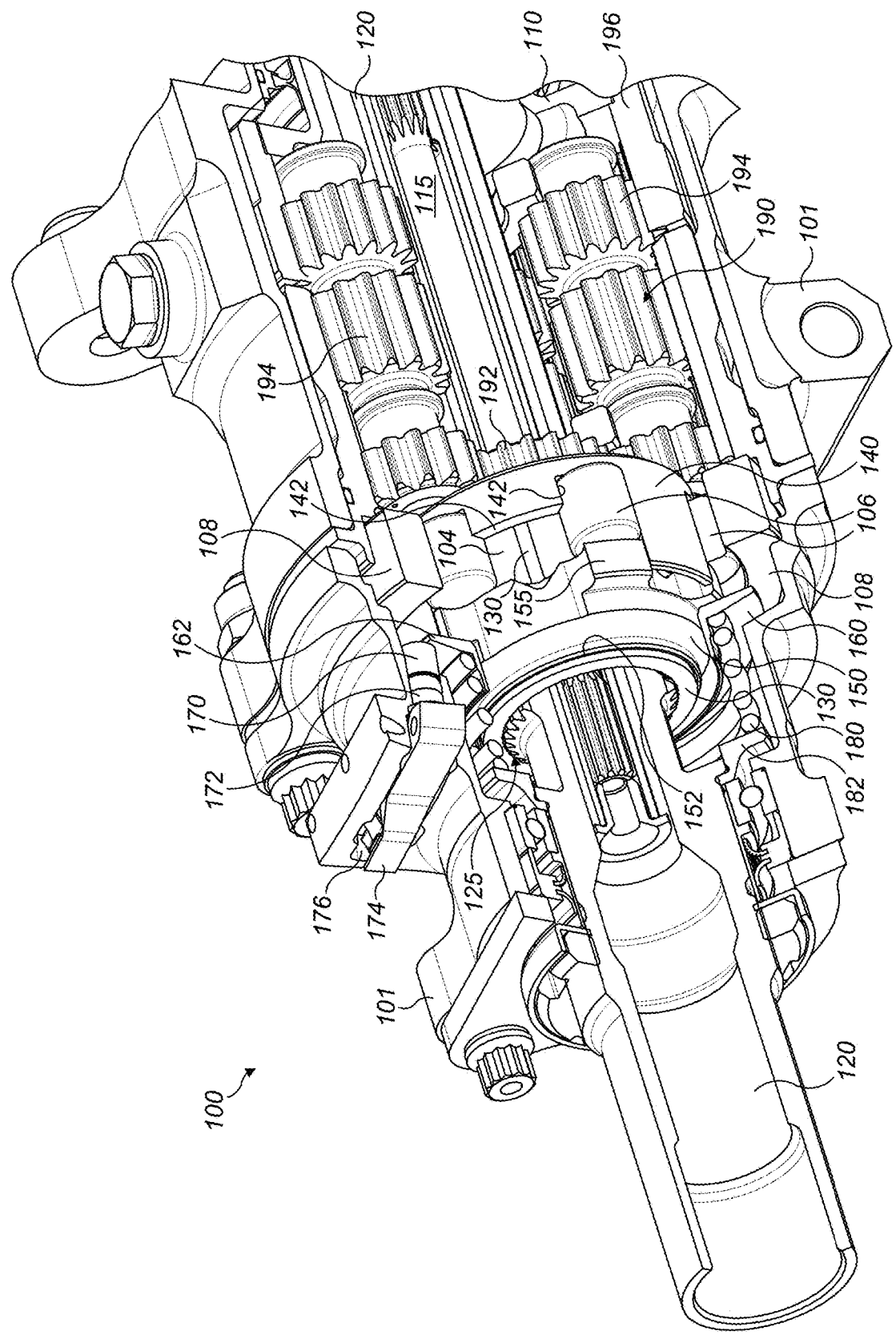
FIG. 2 shows an embodiment of the present disclosure.

FIG. 2 shows a torque limiter 100 according to an embodiment of the present disclosure. The torque limiter 100 may be for use within an actuator, for example an actuator for an aircraft, such as for use on an aircraft flight control surface. However, the torque limiter 100 may be used in any suitable application that requires torque to be limited between an input shaft and an output shaft.

The torque limiter 100 comprises an input shaft 120 and an output shaft 110, which are linked by one or more coupling members (not shown). As is known, the coupling members are typically configured to brake the input shaft and the output shaft upon a torque from the input shaft exceeding a predetermined amount.

In the illustrated embodiment, the output shaft 110 is operatively connected (via a gear arrangement 190) to a roller cage 140, and a plurality of rollers 106 are located within respective slots 142 of the roller cage 140. The input shaft 120 is fixed (e.g., elastically) to the roller cage 140 via coupling members such that rotation of the input shaft 120 causes a corresponding rotation of the roller cage 140. In other words, the roller cage 140 does not rotate relative to the input shaft 120 during normal operation, but will do so if a set torque is exceeded as described below.

The gear arrangement 190 includes a sun gear 192 connected to (and, e.g., forming part of) the roller cage 140, as well as a plurality of planetary gears 194 surrounding the sun gear 192, and a fixed ring gear 196 (e.g., attached to the housing 101). The gear arrangement 190 is an optional feature, and not critical to the operation of the broadest aspects of the present disclosure. Furthermore, the gear arrangement 190 may be any suitable gear arrangement, and is not limited to the use of a planetary gear arrangement as shown.

The input shaft 120 is operatively connected to a cam member 130 via a spline arrangement 125. Rotation of the input shaft 120 causes a corresponding rotation in the roller cage 140 via the coupling members. When torque is applied in a clockwise direction to the input shaft 120, torque may be transmitted through the coupling members and a clockwise torque may be applied to the roller cage 140. Similarly, when torque is applied in an anticlockwise direction to the input shaft 120, it may be transmitted through the coupling members so that an anticlockwise torque is applied to the roller cage 140. The torque may be applied through coupling members including a torsion bar 115 preloaded to a set torque.

The cam member 130 comprises a plurality of cam surfaces 104 that are configured to contact the rollers 106. During normal operation, as the input shaft 120 and roller cage 140 rotate, the rollers 106 are free to slide within their respective slots 142 to allow torque to be transmitted between the input shaft 120 and the roller cage 140.

A stationary outer ring 108 (or other component that is fixed against rotation) may surround the moving components may be essentially fixed against rotation, for example by connecting the stationary outer ring 108 to a portion of the housing of the torque limiter 100.

As is known, the coupling members are typically configured to permit a limited amount of relative movement between the input shaft and the output shaft.

When the torque applied by the input shaft 120 exceeds the specified or predetermined amount, the applied torque may cause a brake to be applied. This can be effectuated using the stationary outer ring 108, or other component that is fixed against rotation.

Generally, once the applied torque reaches or exceeds the specified or predetermined amount, there is relative angular movement between the input shaft 120 and the output shaft 110

In the illustrated embodiment, upon the input torque exceeding the predetermined amount, the input shaft 120 and the cam member 130 rotate relative to the roller cage 140. Such rotation causes the cam surfaces 104 to rotate relative to the rollers 106, which presses the plurality of rollers 106 against the stationary outer ring 108. This locks the cam member 130 (after it has rotated a specified amount) and, in turn, the roller cage 140 and hence the output against further rotation.

Other methods of causing the torque limiter 100 to trip are known in the art, and may be used, to the extent that they are compatible with the broadest aspects of the present disclosure.

Figure 3:
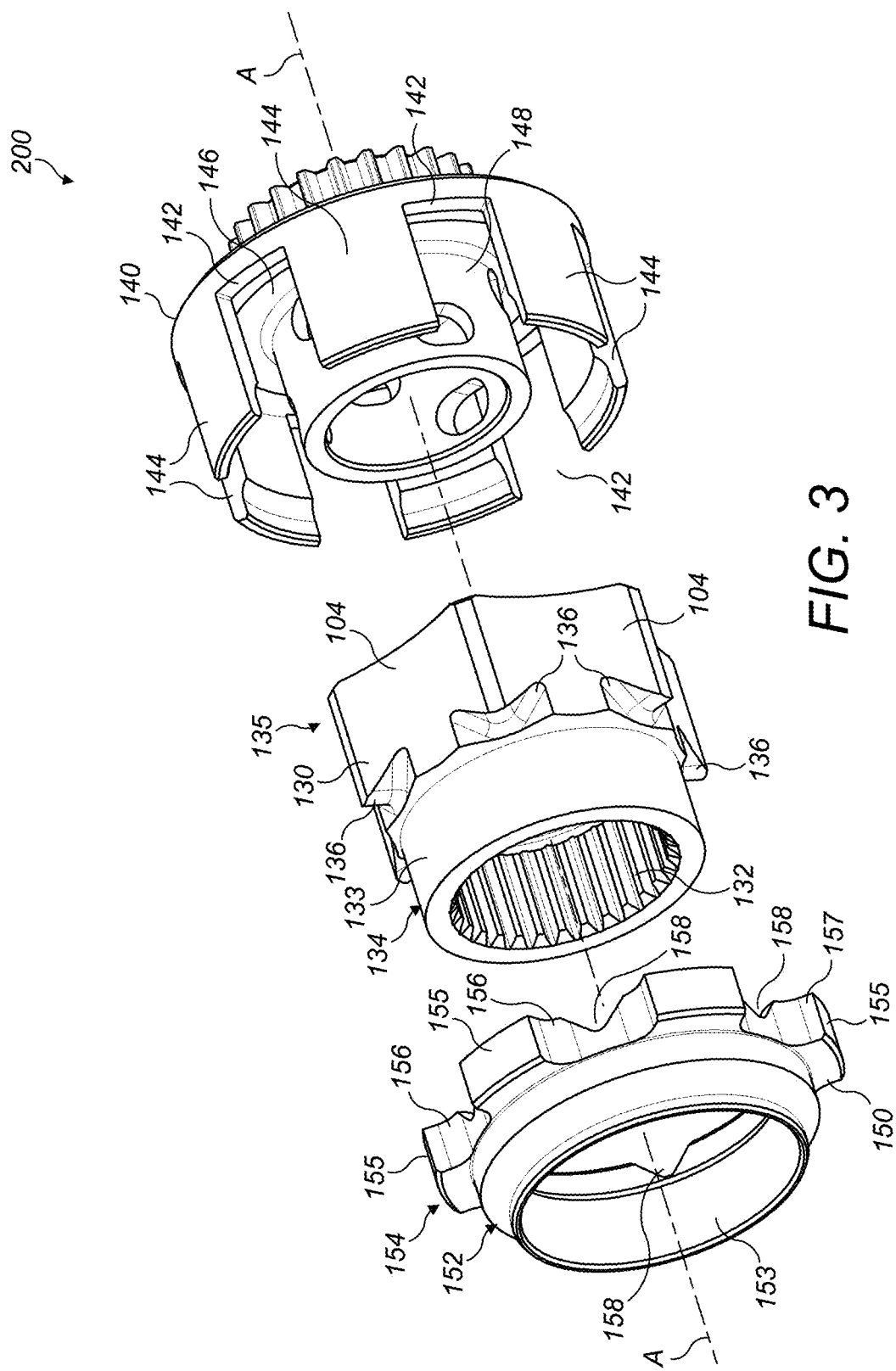
FIG. 3 shows components of the indicator system of the embodiment of FIG. 2 in isolation.

FIG. 3 shows the components of an indicator system 200 for a torque limiter, such as the torque limiter 100 of FIG. 2.

The indicator system 200 comprises a first component 130, a second component 140 and a third component 150.

The first component 130 may be configured for attachment to a first shaft of a torque limiter (e.g., the input shaft 120 of the torque limiter 100 of FIG. 2) or may be integral to it. The first component 130 may comprise a plurality of axially extending splines 132 configured to slot into corresponding (and axially extending) splines located on the first shaft. As such, the first component 130 may be configured to rotate with the first shaft. The first component 130 may be fixed against any axial movement, e.g., along the longitudinal axis A (which may be the longitudinal axis of the torque limiter when the components are incorporated therein).

The second component 140 may be configured for attachment to a second shaft of the torque limiter (e.g., the output shaft 110 of the torque limiter 100 of FIG. 2, and possibly via a gear arrangement), and may be configured to rotate with the second shaft, or cause rotation of the second shaft via a gear arrangement. The second component 140 may be fixed against any axial movement, e.g., along the longitudinal axis A.

In this manner, the first component 130 may be rotatable relative to the second component 140, for example when the first shaft rotates relative to the second shaft upon a torque from one of the shafts exceeding a predetermined amount. The first component 130 may or may not be axially movable (e.g., along the axis A) with respect to the second component 140.

The first component 130 may be a substantially annular (ring-like) member and may comprise a circumferential flange portion 134 comprising an outer circumferential surface 133. The flange portion 134 may be connected to (e.g., formed integral with) a cam portion 135 which is raised from the flange portion 134 and comprises a plurality of radially extending cam surfaces 136, which, in use, face away from the second component 140 and towards the third component 150. The radially extending cam surfaces 136 may be V-shaped.

Figure 1:
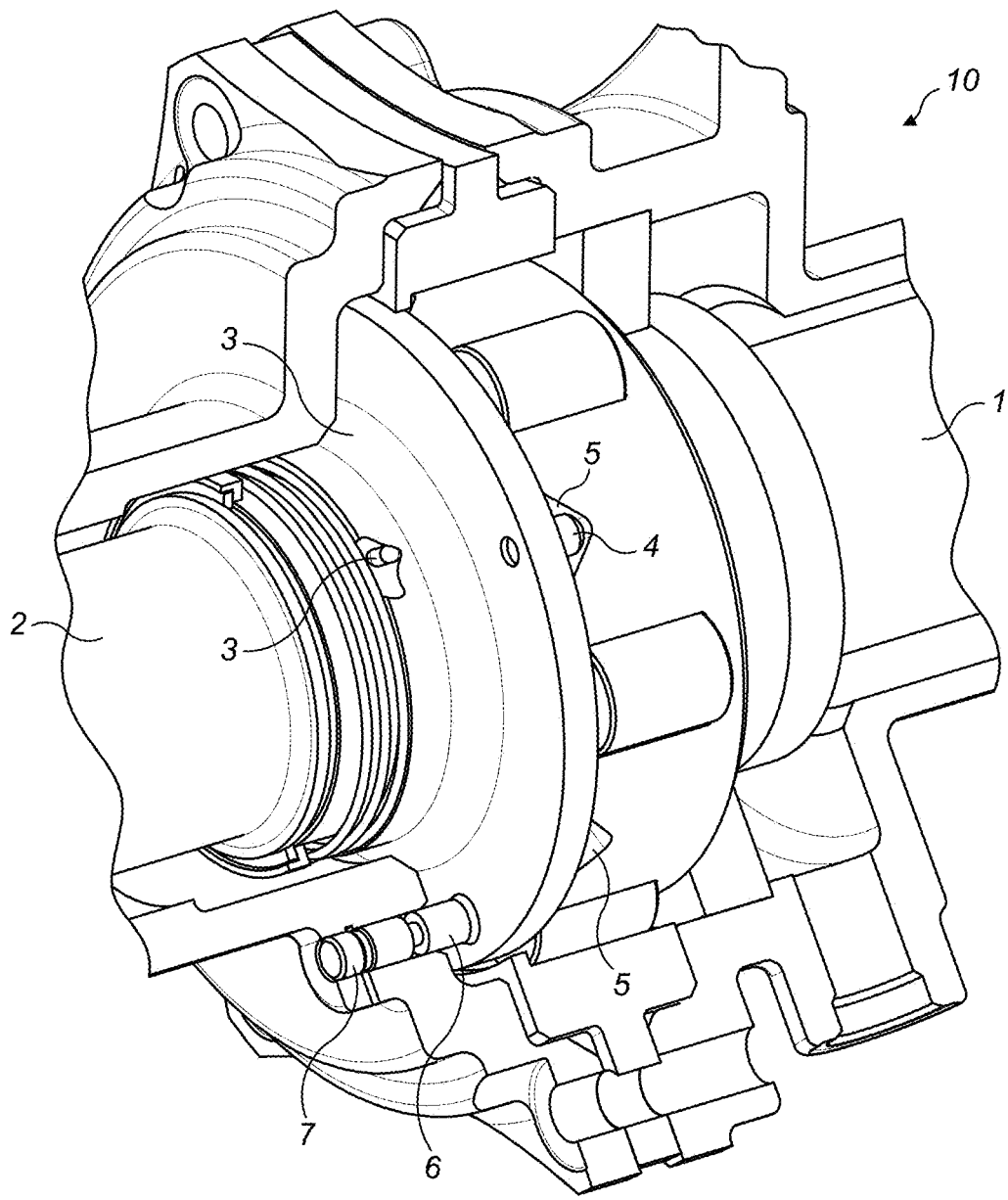
FIG. 1 shows a conventional arrangements for illustrative purposes only.

The first component 130 may comprise further axially extending cam surfaces 104 that interact with other parts of the torque limiter, and as described above in the example of FIG. 2. The cam portion 135 of the first component may be substantially polygonal, for example substantially hexagonal if six further cam surfaces 104 are provided as shown in FIGS. 1 and 2.

The second component 140 comprises a radially extending, annular base portion 146 that extends from an inner radial location to an outer radial location. An axially extending annular flange 148 may extend from the base portion 146 at the inner radial location. A plurality of axially extending teeth 144 extend radially from the base portion 146 at the outer radial location. A plurality of slots 142 are formed by the axial voids between the teeth 144.

The first component 130 may be configured to slide onto the flange 148 of the second component 140, and have a sliding relationship relative to the second component 140 to allow the first component 130 to rotate relative to the second component 140 as described above.

The third component 150 may be a substantially annular member. The third component 150 may comprise a first portion 152 having an inner circumferential surface 153 configured to slide onto the outer circumferential surface 133 of the first component 130. In this manner, the third component 150 may be slidably received onto the first component 130, to allow it to move axially relative to the first component 130 as described herein.

The third component 150 may comprise a second portion 154, which may comprise a plurality of radially extending protrusions 155. A plurality of radially extending slots 156 may be formed between the protrusions 155. Each slot 156 may comprise a circumferentially extending surface 157 having a notch 158. Each notch 158 may extend axially into one of the circumferentially extending surfaces 157 and be configured to cooperate with and contact a corresponding cam surface 136 of the first component 130 in use.

The protrusions 155 of the third component 150 may be configured to slide into the slots 142 of the second component 140. This means that the third component 150 is fixed rotationally with the second component 140, but can move axially relative thereto as the protrusions 155 slide axially within the slots 142.

When the apparatus is initially assembled, the first component 130 is inserted into the second component 140, and the third component 150 is inserted onto the first component 130 such that the cam surfaces 136 of the first component 130 enter respective notches 158 of the third component, and the protrusions 155 of the third component 150 enter the slots 142 of the second component 140.

In use, and during normal operation, the first, second and third components 130, 140 will rotate substantially as a single unit, such that the first component 130 does not rotate relative to the second component 140 and third component 150.

When the applied torque exceeds a specified or predetermined amount, the first component 130 is configured to rotate relative to the second component 140 and third component 150. This causes the notches 158 (e.g., radially extending surfaces thereof) to ride up the cam surfaces 136 of the first component 130 which, in turn, causes the third component 150 to move axially away from the second component 140. The axial movement of the third component 150 may provide an indication that the torque limiter has tripped. For example, movement of the third member 150 may cause a corresponding movement of an indicator member and indicator arm.

Referring back to FIG. 2, this shows an embodiment of how movement of the third component 150 can be used to provide an indication that a torque limiter has tripped.

The first component corresponds to the cam member 130, and is shown operatively connected with the second component, which corresponds to the roller cage 140, such that the protrusions 155 are at least partially located within the slots 142. The third component 150 is located over the cam member 130, and specifically the flange portion 134 of the cam member 130 (see FIG. 3).

A movable abutment 160 in the form of an annular member may be located around the first portion 152 of the third member 150. The movable abutment 160 may be substantially L-shaped. A radially extending flange 162 of the movable abutment 160 may be configured to contact cooperating radial surfaces of the protrusions 155 of the third member 150. The radially extending flange 162 of the movable abutment 160 (e.g., on an opposing side thereof) may also contact a pin 170 that is movable within a cavity or passage 172 of a housing portion 101 of the torque limiter 100. Movement of the pin 170 within the cavity 172 may cause a lever or indicator arm 174 to rotate out of a further cavity 176 in the housing portion 101.

A spring 180 may be biased between the axially movable abutment 160 and an axially fixed portion 182, and may be configured to return the movable abutment 162 its initial position (as shown in FIG. 2) once the applied torque is removed or reduced. The abutment 160 and the portion 182 may be rotatable with the roller cage 140 and the input shaft, respectively.

Upon activation of the torque limiter 100, as described above the cam member 130 rotates relative to the roller cage 140, which causes the rollers 106 to press against the outer ring 108. This locks the torque limiter 100 against any further rotation. During this rotation, the notches 158 in the third component 150 will ride up the radial cam surfaces 136 of the cam member 130, causing the third component 152 move axially away from the roller cage 140 and pushing the movable abutment 160 in the same direction. This, in turn, pushes the pin 170, causing it to move within the cavity 172 and push the lever arm 174 out of its cavity 176 in the housing portion 101. Thus, an operator may inspect the torque limiter 100 and see immediately that the lever arm 174 has been rotated, and the torque limiter 100 has tripped.

The lever arm 174 may not be spring biased. Therefore, upon relaxation of the torque, the spring 180 will move the movable abutment 160 and third component 150 back to their original positions (as shown in FIG. 2), but the pin 170 and lever arm 174 will remain in the indicated position. In order to reset the torque limiter 100, the operator pushes the lever arm 174 back into the cavity 176 of the housing portion 101, which also moves the pin 170 back into its original position adjacent to (or contacting) the movable abutment 160.

Although the present invention has been described with reference to preferred embodiments, it will be understood by those skilled in the art that various changes in form and detail may be made without departing from the scope of the invention as set forth in the accompanying claims.

The invention claimed is:

1. An indicator system for a torque limiter for an aircraft flight control surface actuator, the indicator system comprising:
   a first component extending around an axis (A) and comprising one or more radially extending cam surfaces;
   a second component in combination with a third component, wherein the third component is fixed against rotation relative to the second component, but is axially movable relative to the second component; and
   an indicator member configured to move upon axial movement of the third component away from the second component when an applied torque to one of the first component or the second component exceeds a predetermined or specified amount,
   wherein the third component comprises one or more notches, each receiving one of the radially extending cam surfaces, and upon relative rotation between the first component and the combination of the second component and the third component, a surface of each of the notches is configured to ride up a corresponding cam surface of the first component, such that the third component moves axially away from the first component, thereby causing the third component to move axially away from the second component, and
   wherein the indicator system further comprises a rotationally fixed housing, wherein the indicator member is a lever arm pivotably connected to the housing and configured to move out of a first cavity in the housing upon axial movement of the third component away from the first and second components, so as to provide a visual indication that the torque limiter has tripped upon inspection.

2. The indicator system as claimed in claim 1, wherein the second component comprises one or more axially extending slots and the third component comprises one or more radially extending protrusions each configured to slot into one of the axially extending slots, so as to prevent relative rotation between the second component and the third component whilst allowing axial movement between the second component and the third component.

3. The indicator system as claimed in claim 1, wherein the radially extending cam surfaces, and the corresponding notches are V-shaped.

4. The indicator system as claimed in claim 1, wherein the third component is in sliding engagement with the first component, such that the third component is able to slide axially along the first component.

5. The indicator system as claimed in claim 4, wherein the third component comprises an inner circumferential surface configured to slide onto an outer circumferential surface of the first component.

6. The indicator system as claimed in claim 1, wherein the combination of the second component and the third component is located concentrically around the first component.

7. The indicator system as claimed in claim 1, wherein one or more of the first component, the second component and the third component are in the form of a substantially annular body.

8. The indicator system as claimed in claim 1, wherein the first component comprises a plurality of axially extending splines configured to slot into corresponding splines located on a shaft of the torque limiter.

9. The indicator system as claimed in claim 1, wherein the first component comprises a first portion configured to support the third component in a sliding engagement in use, and a second portion comprising the radially extending cam surfaces, wherein the first portion is axially displaced from the second portion.

10. A torque limiter for an aircraft flight control surface actuator, the torque limiter comprising:
   an indicator system comprising:
   a first component extending around an axis (A) and comprising one or more radially extending cam surfaces;
   a second component in combination with a third component, wherein the third component is fixed against rotation relative to the second component, but is axially movable relative to the second component; and an indicator member configured to move upon axial movement of the third component away from the second component when an applied torque to one of the first component or the second component exceeds a predetermined or specified amount, wherein the third component comprises one or more notches, each receiving one of the radially extending cam surfaces, and upon relative rotation between the first component and the combination of the second component and the third component, a surface of each of the notches is configured to ride up a corresponding cam surface of the first component, such that the third component moves axially away from the first component, thereby causing the third component to move axially away from the second component, and wherein the indicator member is a lever arm pivotably connected to a rotationally fixed housing portion of the torque limiter and configured to move out of a first cavity in the housing portion of the torque limiter upon axial movement of the third component away from the first and second components, so as to provide a visual indication that the torque limiter has tripped upon inspecting the torque limiter.

11. The torque limiter as claimed in claim 10, comprising:
a first shaft operatively attached to the first component such that the first component rotates with the first shaft;
a second shaft operatively attached to the second component such that the second component rotates with the second shaft;
wherein upon the applied torque to one of the first shaft or the second shaft exceeding the predetermined or specified amount, the first component is configured to rotate relative to the second component and cause the third component to move axially away from the second component as aforesaid.

12. The torque limiter as claimed in claim 11, further comprising:
a movable abutment movable with the third component and configured to displace a pin located in a second cavity of the housing portion of the torque limiter upon axial movement of the third component away from the second component, wherein the pin is configured to displace the indicator member out of the first cavity in the housing portion to provide the visual indication that the torque limiter has tripped.

13. A method of indicating that a torque limiter for an aircraft flight control surface actuator has tripped, the method comprising:
transferring torque between a first shaft and a second shaft;
rotating a first component relative to a second component when an applied torque to one of the first shaft or the second shaft exceeds a predetermined or specified amount, the first component extending around an axis (A) and comprising one or more radially extending cam surfaces;
axially moving a third component upon rotation of the first component relative to the second component, the third component being fixed against rotation relative to the second component; and
moving an indicator member upon axial movement of the third component away from the second component;
wherein the third component comprises one or more notches, each receiving one of the radially extending cam surfaces, and upon relative rotation between the first component and the combination of the second component and the third component, a surface of each of the notches is configured to ride up a corresponding cam surface of the first component, such that the third component moves axially away from the first component, thereby causing the third component to move axially away from the second component, and
wherein the indicator member is a lever arm pivotably connected to a rotationally fixed housing portion of the torque limiter and configured to move out of a first cavity in the housing portion of the torque limiter upon axial movement of the third component away from the first and second components, so as to provide a visual indication that the torque limiter has tripped upon inspecting the torque limiter.

* * * * *